United States Patent [19]
Candiani

[11] 3,755,808
[45] Aug. 28, 1973

[54] BINARY-CODE EXPANDER

[75] Inventor: Giampiero Candiani, Milano, Italy

[73] Assignee: Societa Italiana Telecomunicazioni Siemens S.p.A., Milano, Italy

[22] Filed: Sept. 2, 1971

[21] Appl. No.: 177,307

[30] Foreign Application Priority Data

Sept. 24, 1970 Italy ............................ 30135 A/70

[52] U.S. Cl. .......................................... 340/347 DD
[51] Int. Cl. .......................................... H04l 3/00
[58] Field of Search ............................ 340/347 DD; 179/15 BW, 15 BA, 15.55; 178/50, 6 BW; 325/38 A

[56] References Cited

UNITED STATES PATENTS 3,594,560 7/1971 Stanley........................ 340/347 DD

*Primary Examiner*—Daryl W. Cook
*Assistant Examiner*—Jeremiah Glassman
*Attorney*—Karl F. Ross

[57] ABSTRACT

A compressed eight-bit word, including a polarity or sign bit $Q_s$, three range-indicating bits $a$, $b$, $c$ and a group of four significant bits X, Y, Z, W, is reconverted into an original 12-bit word by introducing $(7 - n)$ zeroes between the sign bit $Q_s$ and the significant group, with $n$ representing the numerical value of the three-bit combination $a$, $b$, $c$, inserting a 1 just ahead of bit X unless $a=b=c=0$, and adding a 1 (followed only by "0's") immediately behind bit W if this bit is in other than the No. 12 position. A logic matrix, forming part of a range decoder, receives the bits $a$, $b$, $c$ from an eight-stage input register to control the transfer of significant bits X, U, Z, W to consecutive stages of a 12-bit expansion register, along with an immediately preceding 1 if any of the controlling bits has a finite value. This group of bits is followed in the expansion register by at least one 1 whose position determines the extent to which the significant group with its leading 1 must be shifted away from the sign bit $Q_s$ invariably tranferred to the first stage of that register.

10 Claims, 6 Drawing Figures

Giampiero Candiani
Inventor.
Karl F. Ross
Attorney

Giampiero Candiani
INVENTOR.

BY

Karl F. Ross
Attorney

| $M_1$ | $M_2$ | $M_3$ | $M_4$ | $M_5$ | $M_6$ |
|---|---|---|---|---|---|
| I | 0 —— 15 | $Q_s$ 0000000XYZW | $Q_s$ 000XYZW | $Q_s$ 00000000000 — $Q_s$ 00000001111 | $Q_s$ 0000000 — $Q_s$ 0001111 |
| II | 16 —— 31 | $Q_s$ 0000001XYZW | $Q_s$ 001XYZW | $Q_s$ 00000010000 — $Q_s$ 00000011111 | $Q_s$ 0010000 — $Q_s$ 0011111 |
| III | 32 —— 63 | $Q_s$ 000001XYZW- | $Q_s$ 010XYZW | $Q_s$ 0000010000- — $Q_s$ 0000011111- | $Q_s$ 0100000 — $Q_s$ 0101111 |
| IV | 64 —— 127 | $Q_s$ 00001XYZW— | $Q_s$ 011XYZW | $Q_s$ 000010000— — $Q_s$ 000011111— | $Q_s$ 0110000 — $Q_s$ 0111111 |
| V | 128 —— 255 | $Q_s$ 0001XYZW—— | $Q_s$ 100XYZW | $Q_s$ 00010000—— — $Q_s$ 00011111—— | $Q_s$ 1000000 — $Q_s$ 1001111 |
| VI | 256 —— 511 | $Q_s$ 001XYZW——— | $Q_s$ 101XYZW | $Q_s$ 0010000——— — $Q_s$ 0011111——— | $Q_s$ 1010000 — $Q_s$ 1011111 |
| VII | 512 —— 1023 | $Q_s$ 01XYZW———— | $Q_s$ 110XYZW | $Q_s$ 010000———— — $Q_s$ 011111———— | $Q_s$ 1100000 — $Q_s$ 1101111 |
| VIII | 1024 —— 2047 | $Q_s$ 1XYZW————— | $Q_s$ 111XYZW | $Q_s$ 10000————— — $Q_s$ 11111————— | $Q_s$ 1110000 — $Q_s$ 1111111 |
| | | B | B' | | |

FIG. 4

Giampiero Candiani
INVENTOR.

BY

Karl F. Ross
Attorney

| $M'_1$ | $M'_2$ | $M'_3$ | $M'_4$ |
|---|---|---|---|
| I | $Q_S$ 000XYZW | 00000XYZW100 | 0000000XYZW [1] |
| II | $Q_S$ 001XYZW | 00001XYZW100 | 0000001XYZW [1] |
| III | $Q_S$ 010XYZW | 00001XYZW110 | 000001XYZW1 [1] |
| IV | $Q_S$ 011XYZW | 00001XYZW101 | 00001XYZW10 [1] |
| V | $Q_S$ 100XYZW | 1XYZW1001000 | 0001XYZW100 [1] |
| VI | $Q_S$ 101XYZW | 1XYZW1000100 | 001XYZW1000 [1] |
| VII | $Q_S$ 110XYZW | 1XYZW1000010 | 01XYZW10000 [1] |
| VIII | $Q_S$ 111XYZW | 1XYZW1000001 | 1XYZW100000 [1] |

H

FIG. 5

Giampiero Candiani
INVENTOR.
BY
Karl F. Ross
Attorney

BINARY-CODE EXPANDER

My present invention relates to a digital expander designed to reconstruct an original code word which had been converted into a compressed code word having a lesser number of bits.

Such expanders, along with their complementary compressors, are employed in so-called compander systems serving for the transmission and reception of pulse-code-modulated information, i.e. messages wherein an analog signal (usually a voltage) is translated into its binary equivalent and is subsequently reconstituted from the transmitted code word.

These code words normally have a fixed number ($z$) of bits, the first of them constituting (in the case of a bipolar analog signal) so-called sign bit indicating only the polarity of the analog signal. With conventional coding, the remaining ($z-1$) bits represent $2^{z-1}$ amplitude levels which may be broadly classified in a number of ranges defined by several bits immediately following the sign bit. With a 12-bit code word, for example, the second through eighth bits define eight such ranges which are of equal width on a logarithmic scale but which contain progressively increasing numbers of discrete amplitude levels or quanta established by the bits of lower denominational order. This excessive degree of quantization in the higher ranges could be substantially reduced without materially impairing the signal-to-noise ratio.

In my concurrently filed application Ser. No. 177,325 I have disclosed a method of and a system for compressing a code word of, say, 12 bits into a shorter word, of 8 bits in a specific instance, by counting the number of initial zeroes which precede a group of significant bits and which may immediately follow the usual sign bit. The number $n$ of initial zeroes so counted may range from 0 to $(2^m - 1)$, $m$ being a positive integer; in the aforementioned example of a 12-bit word, these zeroes may occupy up to seven consecutive digital positions starting with the No. 2 position, thereby identifying the eight amplitude ranges discussed above ($m = 3$). The count of these initial zeroes is converted into a binary code combination of $m$ bits, this count being advantageously subtracted from the maximum value of $(2^m - 1)$ before digitization so that the resulting $m$-bit code combination gives directly the order number of the corresponding amplitude range.

Thus, in a general manner, the constant number $z$ of bits in the original code word may be represented as the sum of the number $n$ of initial zeroes, the number $q$ of significant bits to be preserved, and the number $h$ of insignificant bits to be discarded, augmented in most instances by 1 to allow for the inclusion of the sign bit. The number $h$ of insignificant bits complements the number $n$ of initial zeroes to $(2^m - 2)$, dropping to zero for $n = 2^m - 2$ and $n = 2^m - 1$ in the two lowermost amplitude ranges. In the bottom range, $q = q_o = z - 2^m$. Upon shifting from the lowest range to the second-lowest one, the bit in position No. $2^m$ (the eighth position in the aforementioned example) changes from 0 to 1, thereby increasing by 1 the number $q$ of significant bits to be preserved. In all the higher ranges, $q$ remains at this increased value ($q_o + 1$).

The compressed code word resulting from this transformation consists of the $q_o$ bits constituting the basic significant group, the $m$ bits representing the count of initial zeroes, and the preceding sign bit (if used). With $q_o = 4$, a 12-bit original code word can thus be reduced to an eight-bit compressed code word.

The general object of my present invention is to provide a method of and means for substantially reconstituting, in a simple manner, the original code word from the compressed code word available, say, at the receiving end of a communication channel.

A more specific object is to provide a method of and means for making the numerical value of the reconstituted word fall midway within a region of uncertainty created by the omission of insignificant digits in the compression step.

In accordance with the present invention, I separate the group of significant bits in the compressed word from the accompanying $m$-bit combination identifying the amplitude range of the equivalent analog signal; according to the numerical value of this $m$-bit combination, I preface the separated group of significant bits with $n$ zeroes where $n$ may range from 0 to $(2^m - 1)$. Except in the case where the numerical value of the $m$-bit combination identifies the lowest one of the several amplitude ranges, I also insert a 1 just ahead of the group of significant bits. Finally, I add as many supplemental bits behind the significant bits as is necessary to make up the number of bits in the corresponding sequence of the orignal word, this number being one less than the total number of bits in that original word if the first position thereof is occupied by a sign bit. Such a sign bit, appearing also in first place in the compressed word, is transferred directly to a leading position in the re-expanded word.

According to another feature of my invention, the first supplemental bit introduced, i.e. the one immediately following the lowest-ranking significant bit, is invariably a 1. Such supplemental bits are not needed in the two lowermost amplitude ranges; in the third-lowest range the appended 1 is the only supplemental bit, whereas in the higher ranges this bit is followed by a progressively increasing number of zeroes. In the third-lowest range, this appended 1 represents a single insignificant bit dropped from the final position of the original word; since this dropped bit would have been either a 0 or a 1, the potential error is no greater than it would be if the supplemental bit were a 0. In all higher ranges, the addition of a 1 followed by one or more zeroes establishes approximately the mean level of the narrow band of amplitudes encompassed by the compressed word.

In order to carry out the method just described, an expander embodying my invention includes an input register with a sufficient number of stages to accommodate the $m$ range-indicating bits and the $q_o$ significant bits of the compressed code word, together with the sign bit if used. From this input register the significant bits are transferred to consecutive stages of a larger expansion register designed to accommodate the bits of the reconstituted code word (except for the sign bit). This transfer is performed, under the control of the $m$ range bits, by circuitry advantageously including a set of gates which form part of a logic matrix and which direct the significant bits to positions in the expansion register determined by the numerical value $p$ of the combination of range bits. If the compressed code word stored in the input register is so constituted that this numerical value $p$ equals the difference between $(2^m - 1)$ and the number $n$ of initial zeroes present (after the sign bit) in the original code word, the logical circuitry introduces a finite or unity bit 1 into a stage of the expansion register immediately preceding the stages occupied by the significant bits, provided that at least one of the *m* range bits fed to the logic network has a true value to indicate an amplitude range other than the lowest one.

In order to allow for the proper number of zeroes (i.e. empty stages) in the expansion register on either side of the group of significant bits, the gating matrix of the logic network introduces a finite marking bit into a stage of the expansion register following the ones occupied by that group. A stepping circuit, which may include a source of continuously generated clock pulses, then shifts the entire contents of the expansion register by a number of stages determined by the position of the marking bit, this number of stages being zero for certain range-bit combinations. As will be apparent hereinafter, the marking bit may be identical with the appended supplemental 1 for the two lowest ranges which, therefore, require the insertion of but a single 1 behind the group of significant bits.

The significant bits in the expansion register, the zeroes represented by stages of that register left empty after the shift, and any further bits other than the marking bit introduced by the logic network are then read out, preferably in parallel, to an output register which may have an added stage for the sign bit delivered directly by the input register. This output register may form part of a conventional decoder serving to reconvert the re-expanded code word into a replica of the original analog signal.

The above and other features of my invention will be described in detail hereinafter with reference to the accompanying drawing in which:

FIG. 4 is a table serving to explain the conversion of an original 12-bit code word into a compressed 8-bit code word in conformity with my above-identified copending application;

FIG. 5 is a table serving to explain the re-expansion of the compressed code word pursuant to the present invention.

Figure 1:
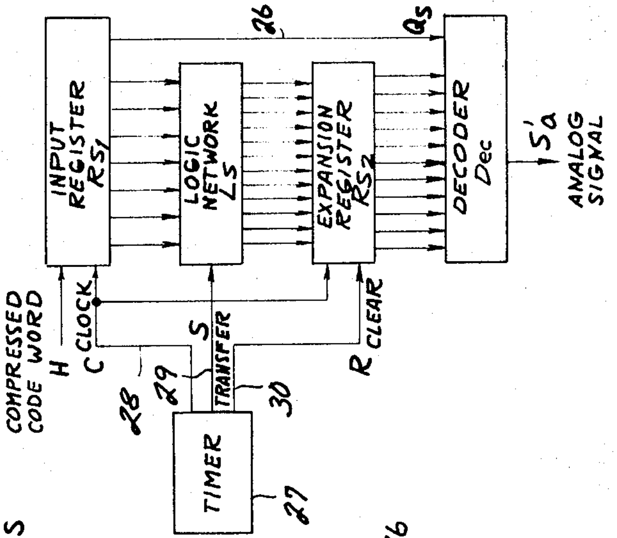
FIG. 1 is an overall block diagram of a code expander according to the invention.

Reference will first be made to FIG. 4 which in column $M_1$ lists eight amplitude ranges I – VIII whose numerical limits (in any convenient units, e.g. millivolts) are given in column $M_2$. According to column $M_3$, each of these ranges can be represented by a generalized 12-bit word including a sign bit $Q_s$ followed by an 11-bit sequence B; each of these words contains a significant group of four consecutive bits X, Y, Z, W preceded, in every range except the first one, by a finite bit 1. In each of the lower ranges I – VII, sequence B also includes one or more initial zeroes ahead of the significant group; in ranges III – VIII, the significant group is followed by one or more insignificant bits symbolized by dashes.

Column $M_4$ shows the compressed code words derived from the original words of column $M_3$, these compressed words being headed by the sign bit $Q_s$ preceding a seven-bit sequence B'. This sequence B' consists of a three-bit code group, varying from 000 to 111, and of the four significant bits X, Y, Z, W of the original sequence B. Column $M_5$ gives the lowest and highest binary values for the generalized code words of column $M_3$; column $M_6$ does the same for the generalized code words of column $M_4$.

It will be noted that the three first bits *a, b, c* of sequence B' are the binary equivalent of the range classification appearing in column $M_1$. It will also be apparent that the compressed words of column $M_4$ contain all the information of the original words in column $M_3$ with the exception of that conveyed by the insignificant bits.

FIG. 5 shows in column $M'_1$ the range classification appearing in column $M_1$ of FIG. 4. Column $M'_2$ of FIG. 5 reproduces at H the compressed code words of column $M_4$ in FIG. 4. Column $M'_3$, FIG. 5, shows the last seven bits (following the sign bit $Q_s$) of the code words of column $M'_2$ expanded into 12-bit sequences in which the significant bits X, Y, Z, W occupy positions Nos. 6 – 9 in each of the four lower ranges I – IV and positions Nos. 2 – 5 in each of the four upper ranges V – VIII. It will be noted that in each instance a bit 1 immediately follows the lowest-ranking significant bit W and that in all cases except range I (top of the column) another 1 immediately precedes the highest-ranking significant bit X. In the six higher ranges III – VIII, the 1 immediately following the bit W is followed with progressively increasing spacing by a further bit 1 constituting the aforedescribed marking bit. In the two top rows (ranges I and II) this marking bit is represented by the unity bit immediately to the right of bit W.

Column $M'_4$ shows all the above-discussed bits of column $M'_3$ shifted to the right so as to place the marking bits in last position, except for ranges IV and VIII where the marking bits already occupied that position before. These marking bits have been shown bracketed in column $M'_4$ since, as will be described hereinafter, they are dropped upon transfer of the sequences of column $M'_4$ to the final decoder.

I shall now describe, with reference to FIGS. 1 – 3 and 6, a system for carrying out the re-expansion method outlined above.

A compressed code word H, of the type shown in FIG. 4 (column $M_4$) and FIG. 5 (column $M'_2$), is delivered to and stored in an eight-stage input register $Rs_1$ which may be loaded in series and read out in parallel.

The sign bit $Q_s$ is directly transmitted to a corresponding register stage in a decoder Dec, by way of a line 26. The remaining seven bits, i.e. the three range bits *a, b, c* and the four significant bits X, Y, Z, W, are delivered to a logic network Ls which evaluates the range bits and channels the significant bits to either of two sets of four consecutive stages in an expansion register $Rs_2$ as more fully described hereinafter. Added to the significant bits in the expanison register are one or more bits of unity value (1) which, except for a final marking bit, are fed to the decoder Dec after a longitudinal shift (in most instances) in the direction of the sign bit $Q_s$. A timer 27, illustrated in FIG. 1, has output leads 28, 29 and 30 for transmitting a train of clock pulses C to registers $Rs_1$ and $Rs_2$, a transfer pulse S to logic network Ls, and a clearing and read-out pulse R to register $Rs_2$. Decoder Dec emits a replica $S'_a$ of an original analog signal transmitted in digitized form to the receiving station containing the expander of FIGS. 1 and 2.

Figure 2:
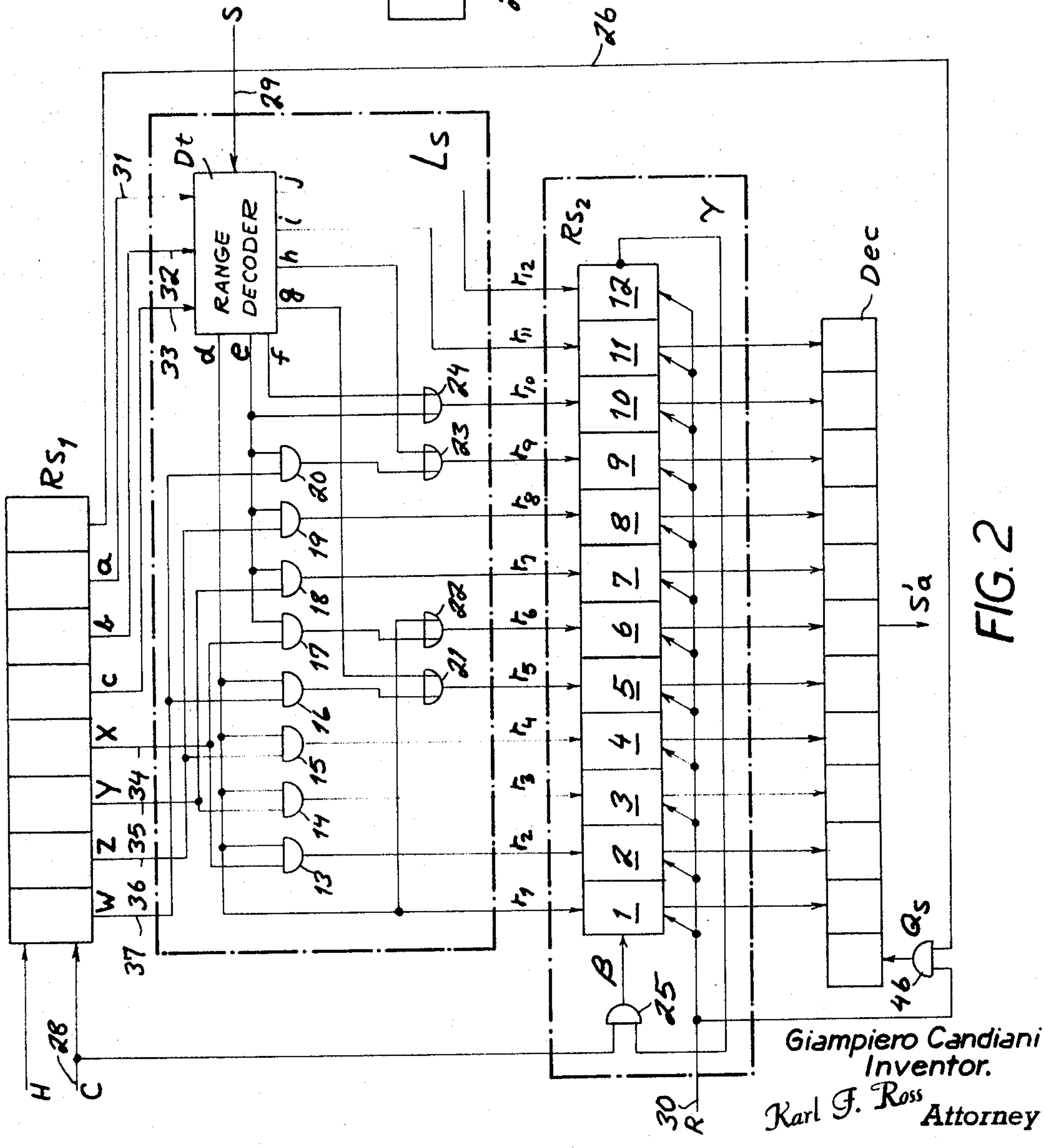
FIG. 2 is a more detailed diagram of the system of FIG. 1.

As seen in FIG. 2, logic network L$s$ includes a range decoder D$t$ with input connections 31, 32, 33 receiving the bits $a$, $b$ and $c$ from register R$s_1$. This unit D$t$ has seven outputs designated $d$, $e$, $f$, $g$, $h$, $i$ and $j$. A set of AND gates 13 – 20 have first inputs connected partly to output $d$ and partly to output $e$ of unit D$t$, their second inputs being tied in pairs to four other stage outputs 34 – 37 of register R$s_1$ carrying the bits X, Y, Z and W.

Expansion register R$s_2$ has 12 stages designated 1 through 12, with input leads $r_1$ – $r_{12}$ connected to the outputs of AND gates 13 – 20 and also to the outpus $d$ – $j$ of range decoder D$t$, partly by way of several OR gates 21 – 24. A further AND gate 25 has one input connected to timer lead 28 and another input tied in a feedback loop to an inverting output of the last and lowest-ranking stage 12 of register R$s_2$ from which it receives a true signal $\gamma$ as long as that stage contains a 0, i.e. does not store a finite bit. In presence of the feedback signal $\gamma$, therefore, gate 25 delivers stepping pulses $\beta$ to the input of register R$s_2$ in the rhythm of clock pulses C.

It will be noted that main decoder D$ec$ also has twelve stages but that only eleven of them are connected to respective stages 1 – 11 of register R$s_2$, the remaining stage receiving the sign bit $Q_s$ from register R$s_1$ over conductor 26 through an AND gate 46 having its second input connected to lead 30.

Figures 3, 6:
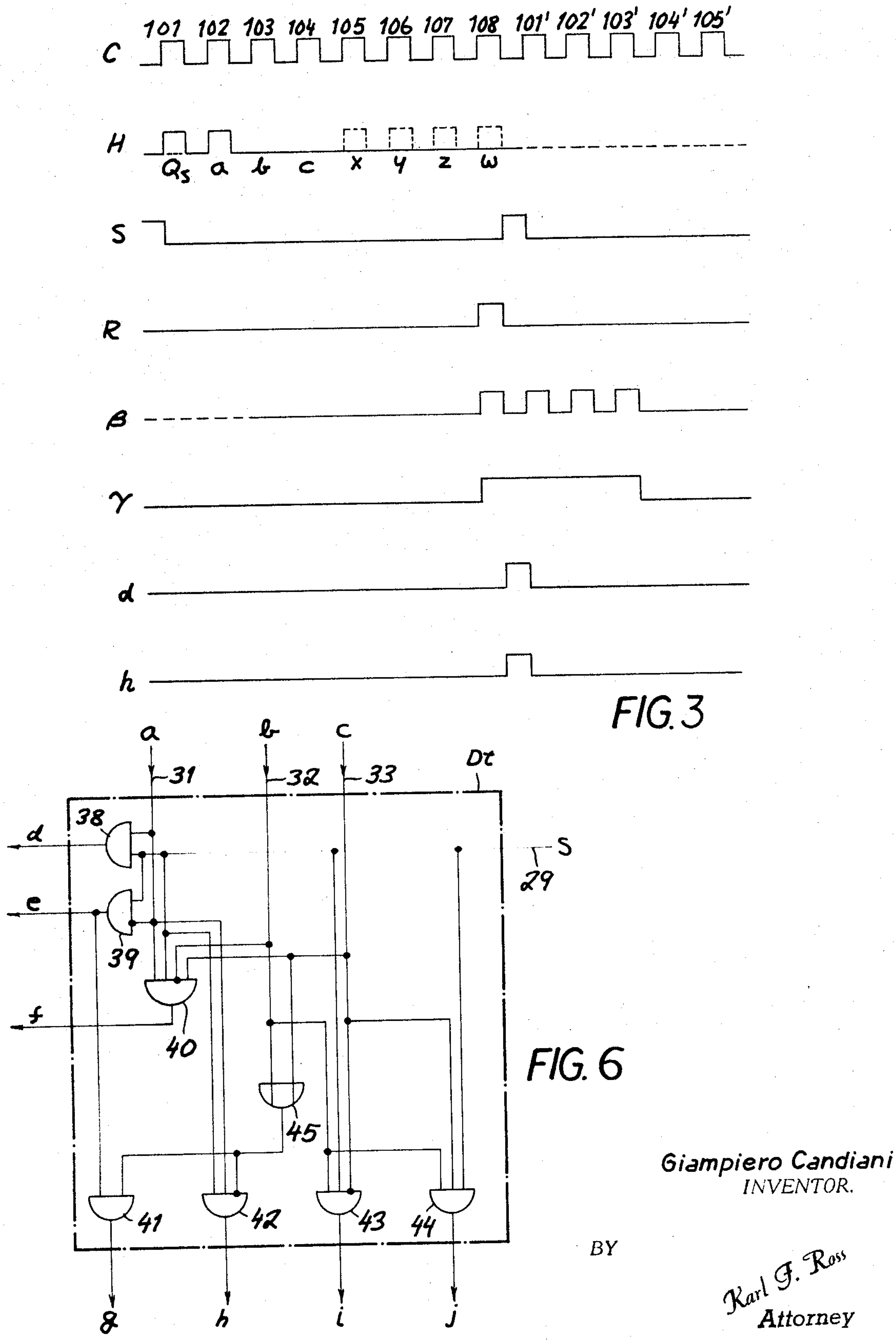
FIG. 3 is a time chart illustrating a variety of pulses generated in the system of FIGS. 1 and 2.
FIG. 6 shows details of a logic network illustrated in FIG. 2.

FIG. 6 shows range decoder D$t$ as comprising a set of AND gates 38, 39, 40, 41, 42, 43 and 44 respectively delivering the output signals $d$ – $j$, each of these AND gates having an input tied to lead 29 which carries the transfer pulse S. Gates 41 and 42 also have a noninverting input and an inverting input, respectively, connected to the output of a further OR gate 45 with input connections to leads 32 and 33. Lead 31 carries the signal $a$ to noninverting inputs of gates 38, 40, 42 and to an inverting input of gate 39, the output of the latter feeding the second input of gate 41. Lead 32 is connected to an inverting input of gate 40 and to noninverting inputs of gates 43 and 44, lead 33 being tied to an inverting input of gate 43 and a noninverting input of gate 44.

The operation of the logic network D$t$ is given by the following truth table:

| $a$ | $b$ | $c$ | $d$ | $e$ | $f$ | $g$ | $h$ | $i$ | $j$ |
|---|---|---|---|---|---|---|---|---|---|
| 0 | 0 | 0 | 0 | 1 | 0 | 0 | 0 | 0 | 0 |
| 0 | 0 | 1 | 0 | 1 | 0 | 1 | 0 | 0 | 0 |
| 0 | 1 | 0 | 0 | 1 | 0 | 1 | 0 | 1 | 0 |
| 0 | 1 | 1 | 0 | 1 | 0 | 1 | 0 | 0 | 1 |
| 1 | 0 | 0 | 1 | 0 | 0 | 0 | 1 | 0 | 0 |
| 1 | 0 | 1 | 1 | 0 | 1 | 0 | 0 | 0 | 0 |
| 1 | 1 | 0 | 1 | 0 | 0 | 0 | 0 | 1 | 0 |
| 1 | 1 | 1 | 1 | 0 | 0 | 0 | 0 | 0 | 1 |

A typical sequence of operations of the system of FIGS. 1 and 2 will now be described with reference to FIG. 3 for a code word of the type depicted in the fifth row (range V) of the several columns of FIG. 5.

An operating period of timer 27 consists of eight clock cycles represented by pulses 101 – 108 in the top graph of FIG. 3; some clock pulses of the following timer period have been indicated at 101′ – 105′.

At the end of the eighth cycle, the eight bits of code word H occupy corresponding stages of register R$s_1$; bits X, Y, Z, W have been shown in dotted lines to indicate that they may have a value of either 0 or 1. Clearing pulse R, generated at that instant, is applied to all the stages of register R$s_2$ to transfer their contents to corresponding stages of decoder D$ec$ except for stage 12 which is merely emptied. Pulse R also enables the transfer of signal $Q_s$ from register R$s_1$ to the decoder D$ec$. As a result, feedback signal $\gamma$ comes into existence whereby the first stepping pulse $\beta$ may coincide with clock pulse 108 but will be ineffectual since register R$s_2$ at this point contains only zeroes. Transfer pulse S is emitted on lead 29 before the occurrence of the next clock pulse 101′ and causes the energization of one or more outputs of range decoder D$t$, in accordance with the foregoing truth table, depending on the pattern of energization of leads 31 – 33.

In the example under discussion, the three-bit code combination $a$, $b$, $c$ is 100; thus, lead 31 is the only one energized. Since OR gate 45 does not conduct, AND gates 38 and 42 generate output signals $d$ and $h$ with energization of leads $r_1$, $r_6$ (via OR gate 22), and $r_9$ (via OR gate 23). Signal $d$ also opens AND gates 13 – 16 for the passage of bits X, Y, Z, W to relatively high-ranking stages 2 – 5 by way of the corresponding conductors $r_2$ – $r_5$. The contents of register R$s_2$ are now identical with the sequence given in the fifth row of column $M'_3$ in FIG. 5.

The next stepping pulse $\beta$, coinciding with clock pulse 101′ and therefore with the beginning introduction of a fresh word H into input register R$s_1$, shifts all the bits in register R$s_2$ one stage to the right; this process is repeated during the next two clock cycles whereupon, at a time coinciding with the occurrence of clock pulse 103′, the marking bit 1 previously entered in stage 9 appears in stage 12 of the expansion register. This loading of the last register stage by the marking bit terminates the feedback signal $\gamma$ and prevents further stepping of register R$s_2$. That register is therefore now in condition to transfer its contents, upon the occurrence of the next clearing pulse R, to decoder D$ec$ which is discharged in the interim after converting the previous 12-bit code word into a regenerated analog signal $S'_a$.

As will be apparent from the foregoing truth table, the presence of bit $\bar{a}$ (de-energization of conductor 31) in lieu of signal $a$ would have produced the output $e$ instead of $d$, thereby causing the transfer of significant bits X, Y, Z, W to relatively low-ranking stages 6 – 9 via AND gates 17 – 20 and OR gates 22, 23. The other operations discussed in conjunction with FIG. 5 will also be readily traceable from that truth table and the logic of FIGS. 2 and 6. In the presence of an output $j$ of range decoder R$t$, occurring whenever both leads 32 and 33 are energized, the direct introduction of a marking bit into register stage 12 suppresses the signal $\gamma$ so that no stepping pulses $\beta$ are generated and the contents of register R$s_2$ are not shifted prior to transfer to decoder D$ec$.

I claim:

1. A method of re-expanding a compressed code word, derived from an original code word with a predetermined larger number of bits, into a substantial duplicate of said original code word, said compressed word including a group of significant bits preceded by an m-bit combination identfying one of several amplitude ranges of an analog signal represented by said original code word, comprising the steps of:

a. separating said $m$-bit combination from said group of significant bits;

b. prefacing said significant group with up to $(2^m-1)$ zeroes, the number n of such zeroes depending upon the numerical value of said *m*-bit combination;

c. inserting a 1 just ahead of said group of significant bits upon said numerical value identifying any but the lowest one of said amplitude ranges; and d. introducing as many supplemental bits behind said significant bits as is necessary to make up said predetermined larger number of bits, the highest-ranking supplemental bit being invariably a 1, all other supplemental bits being zeroes.

2. A method as defined in claim 1 wherein both the original word and the compressed word include a sign bit in first position, comprising the further step of transferring said sign bit from said compressed word to a leading position in the re-expanded word.

3. A method as defined in claim 1 wherein said number *n* equals the difference between ($2^m$—1) and said numerical value.

4. A system for re-expanding a compressed code word, derived from an original code word with a predetermined larger number of bits, into a substantial duplicate of said original code word, said compressed word including a group of significant bits preceded by an *m*-bit combination identifying one of several amplitude ranges of an analog signal represented by said original code word, comprising:

an input register with a number of stages sufficient to accommodate the *m* bits of said combination and said significant bits;

an expansion register with a larger number of stages including a last stage of lowest numerical rank;

circuitry between said registers for transferring said significant bits from respective stages of said input register to consecutive stages of said expansion register ahead of said last stage;

logic means with input connections to stages of said input register accommodating said *m* bits, said logic means controlling said citcuitry for introducing a finite marking bit into a stage of said expansion register following those occupied by said significant bits, the number of stages separating the latter stages from the stage occupied by said marking bit depending upon the numerical value p of said m-bit combination; and stepping means connected to said expansion register for jointly shifting said significant bits and said markimg bit therein to lower-ranking stages until said marking bit occupies said last stage.

5. A system as defined in claim 4 wherein said logic means comprises a gating matrix in said circuitry responsive to the presence of at least one true signal on said input connections for introducing another finite bit into a stage of said expansion register immediately preceding the stages occupied by said significant bits for joint shifting with said significant bits and said marking bit by said stepping means.

6. A system as defined in claim 5 wherein said gating matrix is operative, in response to a numerical value *p* identifying any except the two lowest amplitude ranges, to introduce a further finite bit into a stage of said expansion register immediately following the stages occupied by said significant bits.

7. A system as defined in claim 4 wherein said stepping means comprises a source of clock pulses for progressively shifting the contents of said expansion register and feedback means connected to said last stage thereof for blocking said clock pulses upon arrival of said marking bit in said last stage.

8. A system as defined in claim 7, further comprising an output register with respective stages connected to the stages of said expansion register other than said last stage, and read-out means effective after operation of said stepping means for unloading the stages of said expansion register other than said last stage into corresponding stages of said output register.

9. A system as defined in claim 8, wherein said input register has an additional stage accommodating a sign bit, said output register having a corresponding stage directly connected to said additional stage for receiving said sign bit therefrom.

10. A system as defined in claim 5 wherein said gating matrix has a first output for causing the transfer of said significant bits from said input register to relatively low-ranking consecutive stages of said expansion register, in response to magnitudes of said numerical value *p* identifying a lower group of amplitude ranges, and a second output for causing the transfer of said significant bits from said input register to relatively high-ranking consecutive stages of said expansion register, in response to magnitudes of said numerical value p identifying a higher group of amplitude ranges.

* * * * *